(12) United States Patent
 Shuster

(10) Patent No.: US 10,200,498 B2
(45) Date of Patent: *Feb. 5, 2019

(54) METHOD AND APPARATUS FOR PROVIDING CONTENT TO USERS

(71) Applicant: Intellectual Ventures I LLC, Wilmington, DE (US)

(72) Inventor: Brian Shuster, Stateline, NV (US)

(73) Assignee: Intellectual Ventures I LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/339,357

(22) Filed: Oct. 31, 2016

(65) Prior Publication Data

US 2017/0244807 A1 Aug. 24, 2017

Related U.S. Application Data

(63) Continuation of application No. 13/652,192, filed on Oct. 15, 2012, now Pat. No. 9,483,772, which is a
(Continued)

(51) Int. Cl.
  *G06F 17/00* (2006.01)
  *H04L 29/08* (2006.01)
  (Continued)

(52) U.S. Cl.
  CPC .......... *H04L 67/325* (2013.01); *G06Q 30/02* (2013.01); *H04L 43/106* (2013.01); *H04L 43/16* (2013.01);
  (Continued)

(58) Field of Classification Search
  CPC .............................. G06F 9/4443; G06F 3/0481
  (Continued)

(56) References Cited

U.S. PATENT DOCUMENTS 5,604,542 A * 2/1997 Dedrick ................. H04N 7/088
  348/460
5,737,619 A 4/1998 Judson
  (Continued)

FOREIGN PATENT DOCUMENTS

WO 9825198 6/1998
WO 9959097 11/1999

OTHER PUBLICATIONS

Marable, et al., "Designing Smart Pop-up Windows," Web Techniques, Jul. 1998, Miller Freeman, USA, vol. 3, No. 7, XP008019169, pp. 65-68.
(Continued)

*Primary Examiner* — Stephen S Hong
*Assistant Examiner* — Matthew J Ludwig
(74) *Attorney, Agent, or Firm* — Meyertons, Hood, Kivlin, Kowert & Goetzel, P.C.

(57) ABSTRACT

Embodiments of the instant invention are directed to a method and apparatus for presenting unsolicited data to users without interrupting the user's activities, wherein the presentation of the unsolicited data is monitored and is available for review by the user at the user's convenience. Embodiments of the invention comprise a content and display manager, wherein the content and display manager include a display monitor, a content delivery system and a content controller. The display monitor selects the display of content to the users, in part, by reviewing a marker which defines the last time that content was displayed to the user and the type of content displayed. The content delivery system transmits a content window to a user computer via the controller.

17 Claims, 2 Drawing Sheets

Related U.S. Application Data continuation of application No. 09/419,698, filed on Oct. 14, 1999, now Pat. No. 8,291,340.

(51) Int. Cl.
*G06Q 30/02* (2012.01)
*H04L 12/26* (2006.01)
*G09G 5/14* (2006.01)

(52) U.S. Cl.
CPC ............ *H04L 67/02* (2013.01); *H04L 67/146* (2013.01); *G09G 5/14* (2013.01); *G09G 2370/022* (2013.01)

(58) Field of Classification Search
USPC ......... 715/204, 234, 745, 749; 709/219, 224
See application file for complete search history.

(56) References Cited

U.S. PATENT DOCUMENTS

| | | | |
|---|---|---|---|
| 5,841,420 A | 11/1998 | Kaply et al. | |
| 5,913,040 A * | 6/1999 | Rakavy | G06Q 30/02 370/229 |
| 5,937,392 A | 8/1999 | Alberts | |
| 6,011,537 A | 1/2000 | Slotznick | |
| 6,018,619 A | 1/2000 | Allard et al. | |
| 6,128,663 A | 10/2000 | Thomas | |
| 6,201,538 B1 | 3/2001 | Wugofski | |
| 6,285,985 B1 | 9/2001 | Horstmann | |
| 6,314,451 B1 | 11/2001 | Landsman et al. | |
| 6,317,782 B1 | 11/2001 | Himmel et al. | |
| 6,317,789 B1 * | 11/2001 | Rakavy | G06Q 30/02 709/203 |
| 6,353,849 B1 | 3/2002 | Linsk | |
| 6,393,407 B1 | 5/2002 | Middleton, III et al. | |
| 6,421,733 B1 | 7/2002 | Tso et al. | |
| 6,473,102 B1 | 10/2002 | Rodden et al. | |
| 6,642,944 B2 | 11/2003 | Conrad et al. | |
| 6,687,737 B2 | 2/2004 | Landsman et al. | |
| 6,721,795 B1 | 4/2004 | Eldreth | |
| 6,785,659 B1 | 8/2004 | Landsman et al. | |

OTHER PUBLICATIONS

Netscape Communications Corporation, Client-side object javascript Reference, May 28, 1999, URL:I/docs.sun.com/source/816-6408-10/window.htm>, 69 pages. [Retrieved Jul. 27, 2001].

Langheinrich, et al., "Unintrusive Customization Techniques for Web Advertising," http://www8.org/w8-papers/2b-customizing/unintrusive/unintrusive.html, 18 pages. [Apr. 11, 2011].

User Interface Pop-up Duration by Contained Content, IBM Technical Disclosure Bulletin, vol. 37, No. 4A, Apr. 1994, XP000446805, p. 623.

European Search Report in Application No. 07106617.9 dated Jul. 30, 2007, 2 pages.

Office Action in Canadian Patent Application No. 2385165 dated Mar. 11, 2010, 4 pages.

Paul Festa, "GeoCitizens bristle at pop-up ads," CNETNews.com, Dec. 18, 1997, https://news.com/2100-1023-206507.html, 3 pages. [Retrieved Apr. 27, 2007].

Brent Lee Metcalfe, "Advanced JavaScript windowing—part one: Self-closing popups," Jul. 23, 1998, http://www.developer.com/lang/other/print.php/603511, 5 pages. [Retrieved Jun. 14, 2005].

Greg Perry, "Sam's Teach Yourself Visual Basic 5 in 24 Hours," Sams Publishing 1st Edition, 1997, pp. 300-307.

Search result page from: http://groups.google.com/groups?q=javascript+blur&hl=en&lr=&scoring=d&as.-sub.-drrb=b&as.sub.-mind=12&as.sub.--minm=5&as.sub.-miny=1981&as.sub.- maxd=31&as.sub.--maxm=12 &as.sub.--maxy=1997&selm=66pt24%24rab%40miwok.nbn.com&rnum=10, From search on Jun. 21, 2002, showing archived page dated Dec. 11, 1997 including program code in JavaScript.

International Search Report in Application No. PCT/US00/28500 dated Jul. 3, 2003, 3 pages.

"Konrad Roeder, :All About the Internet, Part 21—The Dark Side of Cookies," 1997, http://www.geocities.com/kgrr/internet/part21.html, 2 pages. [Retrieved Jan. 15, 2003].

Component Watch, 'FilterGate', last modified Sep. 12, 1999, 5 pages.

\* cited by examiner

METHOD AND APPARATUS FOR PROVIDING CONTENT TO USERS

RELATED APPLICATIONS

The present application is a continuation of U.S. application Ser. No. 13/652,192, filed Oct. 15, 2012 (now U.S. Pat. No. 9,483,772), which is a continuation of U.S. application Ser. No. 09/419,698, filed Oct. 14, 1999 (now U.S. Pat. No. 8,291,340); the disclosures of each of the above-referenced applications are incorporated by reference herein in their entireties.

The present application is also related to U.S. application Ser. No. 09/419,701 (now U.S. Pat. No. 6,763,379) entitled "System, Apparatus and Method for Presenting and Displaying Content On a Wide Area Network,", filed simultaneously herewith, which is incorporated herein by reference.

FIELD OF THE INVENTION

This invention is directed to a method and apparatus for providing content to users on a wide area network with minimal disruption in the user's activities. More specifically, embodiments of this invention direct content to users by displaying pop-up windows that momentarily appear in front of the user's primary browser window, but are moved to a window behind the user's primary window, wherein the data for pop-up window is downloaded.

BACKGROUND OF THE INVENTION

Wide area networks, such as the World Wide Web ("WWW") or the Internet, have become increasingly popular modalities for the advertisement of products. Indeed, much like broadcast medium, for example, radio and television, advertisers will sponsor content in exchange for the right to display their advertisements. Indeed, advertisers sponsor most of the content on the WWW. The sponsorship provided by the advertiser supports the host providers and, in some instances, facilitates free hosting for individual users.

To be effective as a means of generating and promoting products or services, advertisers desire high visibility for their advertisements, that is, advertisers desire to display their advertisements as frequently as possible, wherein the advertisements are not easily avoided or evaded by the consumer. At variance with the advertisers' desire, users do not want to be disturbed in their activities. Currently, unlike the broadcast medium wherein the advertisements are placed in between the content of the main programming, advertisements on the WWW can be displayed at any time, and thus, typically interrupt the content that the user is viewing.

At least one current type of advertising on the WWW is a banner advertisement. Banner advertisements are typically placed at the top or bottom of the page and require the user to affirmatively click on the advertisement in order to visit a web site that contains more detailed information regarding the goods or services indicated in the banner advertisement. Most users now recognize banner advertisements and do not click on these advertisements.

Another form of advertising on the WWW is in the form of a pop-up advertisement. A pop-up advertisement is a window that opens in a new browser window when a user visits a web site. The pop-up window opens in front of the user's primary browser window, thereby forcing the user to take affirmative action, such as, for example, close the advertising window, or forcing the user to view the advertisement and click to the advertiser's site. In many instances, the advertisement fails to be completely displayed as the user closes the pop-up window prior to the completion of the advertisement loading.

In addition to the initial inconvenience and interruption that the pop-up windows cause to the user, the pop-up window advertisements create further problems. For instance, despite the user closing the pop-up window, these windows do not always remain closed. Indeed, at times, if the user visits another page on the site with the pop-up code, the advertisement will reappear, thereby causing the user to once again have to close the window. Further, if the user leaves the page containing the pop-up window, the pop-up window will reopen upon the user's return to the page. Similarly, if the page is reloaded for any reason, the pop-up advertisement will open again. This inability to permanently close these pop-up windows creates a further annoyance for the user as well as exacerbating the for the advertiser and possibly for the web site. As this annoyance can cause a user to avoid web sites, the web site may experience a decrease in traffic, as well as, a decrease in the willingness of other web sites to direct traffic to the sites that utilize these types of advertisements.

A need in the industry exists for a method of presenting unsolicited data to users without interrupting the user's activities and in a manner that allows the unsolicited data to be reviewed by the user at the user's convenience. Further, a need exists for a method of presenting unsolicited data that is monitored such that the unsolicited data is not automatically and continuously reintroduced to the user, but rather, is presented to the user at a predefined rate.

SUMMARY OF THE DISCLOSURE

Embodiments of the instant invention are directed to a method and apparatus for presenting unsolicited data to users without interrupting the user's activities, wherein the presentation of the unsolicited data is monitored and is available for review by the user at the user's convenience. Other methods and apparatus for accomplishing similar objectives are disclosed in the co-pending application Ser. No. 09/419,701, filed by the inventor hereof on Oct. 14, 1999, which is incorporated herein by reference.

Embodiments of the invention comprise a content and display manager, wherein the content and display manager include a display monitor, a content delivery system and a content controller. The display monitor selects the display of content to the users, in part, by reviewing a marker which defines the last time that content was displayed to the user and the type of content displayed. Based upon the information in the marker, the display monitor will decide not to display any content at that time, or it will determine the content to be displayed and submit a request to the content delivery system to display the chosen content.

The content delivery system transmits a content window to the user's browser. The controller controls the downloading of the content from the content delivery system. The controller initially displays the content window in front of a first browser window position and then displays the content window behind the first browser window.

Once the content is downloaded, the display monitor transmits a new marker to the browser, or updates the existing marker. The marker indicates the time of the display and identifies the content displayed.

A feature of embodiments of the instant invention is that the presentation of unsolicited content can be set at a predefined frequency rate. An advantage of this feature is that the frequency with which unsolicited data is displayed is regulated such that the unsolicited content is not repeatedly introduced to the user.

Another feature of embodiments of the instant invention is that the controller is configured to momentarily display a content window in front of the user's foremost browser window and move the content window to a frame behind the browser window to download the content. An advantage of this feature is that the user has become aware that a new window is being downloaded, but the new window is not disruptive of what the user is currently viewing. A further advantage to this feature is that the content designated to be downloaded into the window is hidden from the user during the downloading and thus, has sufficient time to download the information without interruption from the user. Still a further advantage to this feature is that since the user's activities were not interrupted, the user might be more willing to view the unsolicited content when he has completed his current activities.

Another feature of embodiments of the instant invention is that the unsolicited content is presented in a window that can be any size necessary to display the full content of the advertisement up to the size of a full screen. An advantage to this feature is that the user is not required to affirmatively respond to review the unsolicited content.

A further feature of embodiments of the invention is the display analyzer which monitors the frequency of display of content and the specific content presented. An advantage of this feature is that the user is not repeatedly presented with unsolicited content or with the same content.

The above and other features and advantages of embodiments of this invention will be apparent from the following more detailed description when taken in conjunction with the accompanying drawings of illustrative embodiments.

BRIEF DESCRIPTION OF THE DRAWINGS

The detailed description of embodiments of the invention will be made with reference to the accompanying drawings, wherein like numerals designate corresponding parts in the figures.

DETAILED DESCRIPTION OF PREFERRED EMBODIMENTS

Embodiments of the instant invention are directed to a method and apparatus for displaying content to users on a wide area network. Embodiments of the instant invention employ a network of computers and programs for retrieving and displaying content to users on a wide area network, such as, the WWW or the Internet.

Hardware Environment

Figure 1:
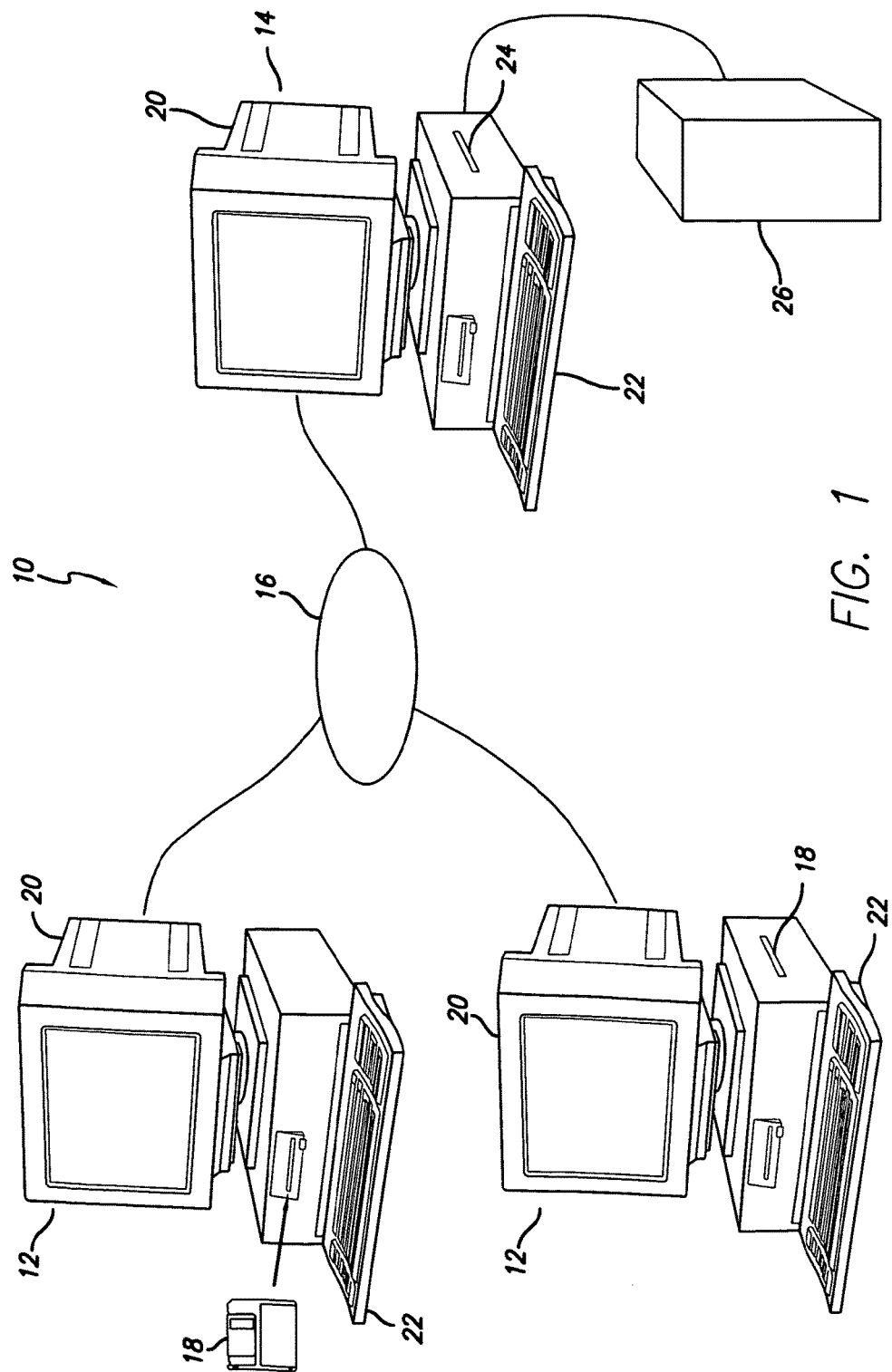
FIG. 1 is a network system environment in accordance with a preferred embodiment of the instant invention.

Preferred embodiments of the instant invention operate with a network comprising a plurality of networked computers, such as, for example, at least one user computer and at least one provider computer which are coupled together in a communications network, such as, for example, the Internet or WWW. FIG. 1 depicts a simplified representation of an example network system 10 that is operated in accordance with preferred embodiments of the invention.

The network system 10 includes at least two client or user computers 12 and at least one provider, or content, computer 14 coupled for communication therebetween by the remainder of the network, generally represented at 16. In the illustrated embodiment, two client or user computers 12 and one content provider computer 14 is shown in the network system. It will be understood that further embodiments may employ any suitable number of user and provider computers. The network system 10 may comprise a closed or intranet configuration, an open or public-access network configuration or combinations of such configurations, as is well known in the art. For example, the user and provider computers 12 and 14 may be included in smaller, interconnected networks which compose the overall network system 10. In an Internet embodiment, the network system 10 comprises a combination of a large number of interconnected internets and intranets. For purposes of simplifying the present disclosure, the various hardware components (for example, host servers, routers, connectors) and software necessary for communication between computers on the network system are not described herein in detail. Such hardware and software are well within the scope of one of ordinary skill in the art and are at least partially dependent upon the type of network system employed and the desired application of use.

The user computer 12 may comprise any suitable network device capable of communicating with other network devices in the network system. In preferred embodiments, the user computer 12 comprises a programmable processor capable of operating in accordance with programs stored on one or more computer readable media 18 (for example, but not limited to floppy disc, hard disc, computer network, random access memory (RAM), CD Rom, or the like), a display device 20 for providing a user-perceivable display (for example, but not limited to visual displays, such as cathode ray tube CRT displays, light-emitting-diode LED or liquid-crystal-diode LCD displays, plasma displays or the like, audio displays or tactile displays), and a user input device 22 (for example, but not limited to, a keyboard, mouse, microphone, or the like). In one preferred embodiment, the user computer comprises a personal computer system having a CRT display, a keyboard and a mouse user-input device.

The user computer 12 is controlled by suitable software, including network communication and browser software to allow a user to request, receive and display information (or content) from or through a content provider computer 14 on the network system 10. In preferred embodiments, the user computer 12 employs a program, such as a browser, for displaying content received from a provider computer 14.

The content provider computer 14 may comprise any suitable network device capable of providing content (data representing text, hypertext, photographs, graphics video and/or audio) for communication over the network. In preferred embodiments, the provider computer comprises a programmable processor capable of operating in accordance with programs stored on one or more computer readable media 24 (for example, but not limited to, floppy disks, hard disks, random access memory RAM, CD-ROM), to provide content for communication to a user computer 12. The provider computer may comprise, for example, but is not limited to, a personal computer, a mainframe computer, network computer, portable computer, personal data assistant (such as, a 3Com Palm Pilot), or the like. The provider computer 14 may include one or more internal data storage devices (not shown) for storing content for communication to a user computer 12. Alternatively, or in addition, the provider computer 14 may be coupled to an external data storage device, computer or other means, generally represented at 26, from which the provider computer 14 may obtain content for communication to a user computer 12. In one embodiment, the external device 26 may comprise a further network device coupled in the network 16.

General Description of Preferred Embodiments

Figure 2:
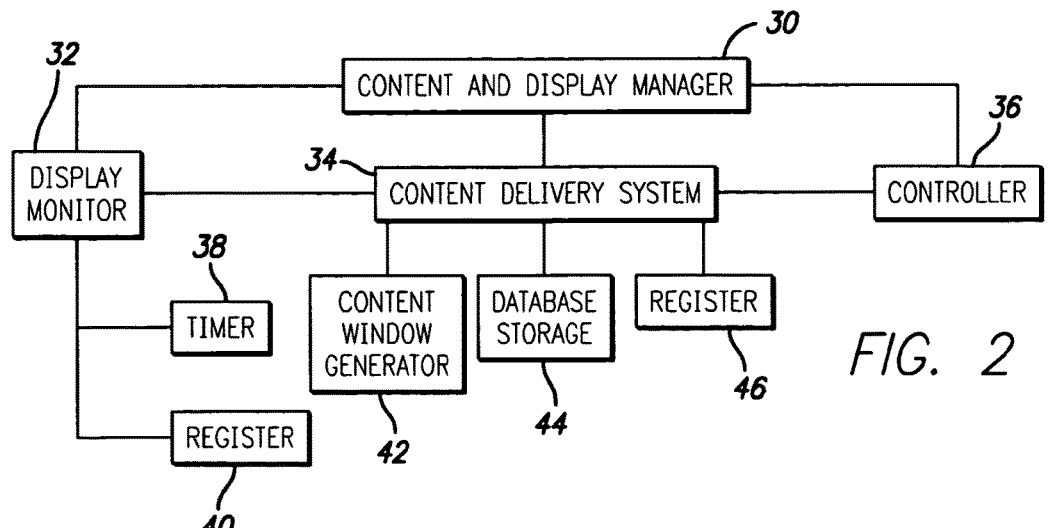
FIG. 2 is a schematic of a content and display manager in accordance with a preferred embodiment of the instant invention.

Embodiments of instant invention are directed to a content and display manager 30. With reference to FIG. 2, the content and display manager 30 comprises a display monitor 32, a content delivery system 34 and a content controller 36.

The display monitor 32 selects the display of content to the users. In one embodiment, the display monitor 32 comprises a timer 38 and a register 40. The timer 38 is set at a predefined period, wherein the timer compares the predefined period to the lapsed time between the current request for content from the user, including, but not limited to, a request for a web site, a web page, any data identified at a specific IP address, or any location of content anywhere, including on a network, to the provider computer 14 and when the most recent content was displayed to the user.

The register 40 lists the available content for display. In preferred embodiments, the register 40 is a text file or a database, although any suitable means for cataloguing or identifying the list of available content is suitable. In another preferred embodiment, specific content is identified for a particular web site or web page.

When a user requests a web site or web page, from the provider computer 14, the display monitor 32 examines the client browser to determine whether it includes a marker (not shown), such as, for example, a cookie. The marker includes a time stamp and the identification of the previously displayed content. If the client browser includes a marker, the display monitor 32 reviews the time stamp on marker to determine whether to display new content. If the time duration between the previous display of content and the current request for a web site or a web page from the provider computer is greater than the predefined period, the display monitor 32 reviews the identification of the previously displayed content. Based upon the previously displayed content, if any, and based upon any other parameters that are normally used to display advertisements, the display monitor 32 chooses a content set to download, and instructs the content delivery system 34 to commence the delivery of the content. In other preferred embodiments, the marker includes other data, including, but not limited to, user information, the list of a predefined number of previously visited sites, browser information, previously displayed content, user IP address, and identification of the user operating system.

The content delivery system 34 includes a content window generator 42, a database storage 44, and a register 46. The window generator 42 is any means capable of generating a content window for downloading, including, a software program or HTML instructions. The database storage 44 is memory that stores the content to be downloaded. The database storage 44 can be located in a separate memory storage means and accessed by the content delivery system, or it can reside resident on the provider computer 14.

The database storage 44 is linked to the register 46. The register 46 is a database that lists the available content and the content's location. The information regarding the identification of the content in the database in register 46 is identical to the identification of the content in register 40.

The controller is a CPU having a set of instructions, or other computer program, whereby the instructions may control the size of and placement of the window generated by the content delivery system 34 and the downloading of the content into the window. Specifically, the controller initially display the content window in front of the primary browser window and then move the content window behind the primary browser window position. In other embodiments, the controller initially displays the content window behind the primary browser window. In some instances, a notification is displayed or flashed to the user that new content has been downloaded. The controller directs the downloading of the content immediately upon the display of the content window. However, the content may not be completely downloaded until the content window resides behind the primary browser window.

Figure 3:
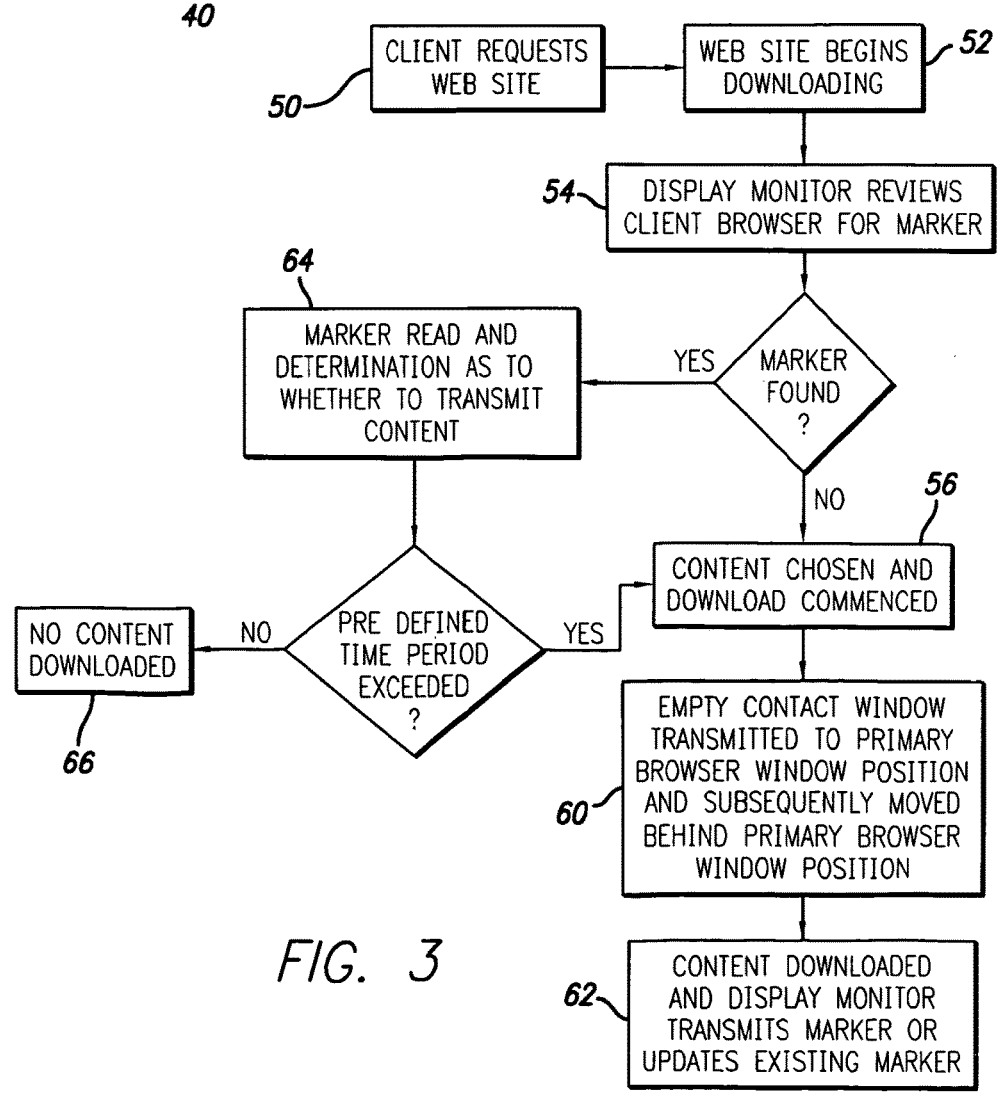
FIG. 3 is a block diagram of selecting and displaying content to users in accordance with a preferred embodiment of the instant invention.

With reference to FIG. 3, in operation, the client browser requests a web site 50 from the provider computer 14. Upon the downloading of the requested web site 52, the content and display manager 30 is initiated and the display monitor 32 checks the client browser to determine whether a marker resides on the client browser 54. If no marker resides on the client browser, the display monitor 32 chooses a content set to download, and instructs the content delivery system 34 to commence the delivery of the content 56.

The content delivery system transmits a content window 60 to the client browser and commences downloading the selected content to the provider computer 14. The content window is momentarily displayed in a newly created browser window, or pop-up window, that appears in front of the user's current primary browser window and is then moved behind the user's primary browser window. The content completes downloading and the content window remains positioned behind the user's primary browser window until the user elects to review the window containing the newly downloaded content. Once the content is downloaded, the display monitor transmits a marker to the client computer 62, wherein the marker indicates the time the user received the content and the identification of the content received. In another embodiment, the marker is downloaded at any time, including downloading the marker prior to, or during, content download.

If a marker is identified on the client browser, the display monitor reads the marker to determine the time when the last content was transmitted to the client browser 64. If the time since the last content download was less than the predefined time period, the display monitor does not instruct the content delivery system 34 to download any new content 66. If instead, the time since the last content download was greater than the predefined time period, the display monitor determines the content to download based on a variety of parameters, including, but not limited to, available advertisements for display, prioritization of available advertisements, demographic information of the user, previous responses of the user to previous advertisements, and previous advertisements displayed, and instructs the content delivery system to download the selected content 56, wherein the downloading of content proceeds as described above. In some embodiments, the downloading of content is not time dependent, but is based, in part, on provider defined parameters, including, but not limited to, available advertisements for display, prioritization of available advertisements, demographic information of the user, previous responses of the user to previous advertisements, and previous advertisements displayed.

Although the foregoing described the invention with embodiments having particular forms that have been illustrated and described, this is not intended to limit the invention. For instance, although preferred embodiments have been described with reference to a wide area network, it is to be understood that embodiments of the invention are also applicable on other networks, including, but not limited to, a local network, an intranet and an internet. Indeed, the foregoing is intended to cover all modifications and alternative constructions falling within the spirit and scope of the invention as expressed in the appended claims.

I claim:

1. A method, comprising:
providing, by a server computer system and to a client computer system, first unrequested content and a cookie including a time stamp specifying when the first unrequested content is provided to the client computer system;
receiving, by the server computer system, a request from the client computer system for content of a web page;
determining, by the server computer system, whether a difference between the time stamp in the cookie and a current time satisfies a threshold; and
based on the determining, sending, by the server computer system, a response to the request, wherein the response includes the requested content and second unrequested content.

2. The method of claim 1, further comprising:
the server computer system modifying the time stamp to specify when the second unrequested content is provided to the client computer system.

3. The method of claim 1, wherein the response includes another cookie that includes a time stamp specifying when the second unrequested content is provided to the client computer system.

4. The method of claim 1, wherein the cookie further includes an identifier specifying the first unrequested content as being presented to the client computer system, and wherein the method further comprises:
the server computer system selecting the second unrequested content based on the identifier.

5. The method of claim 1, further comprising:
the server computer system selecting the second unrequested content based on a response of a client to the first unrequested content.

6. The method of claim 1, wherein the sending includes causing a web browser of the client computer system to present the second unrequested content in a first browser window that appears in front of a second browser window being viewed at the client computer system.

7. The method of claim 6, further comprising:
the server computer system moving the first browser window behind the second browser window.

8. A method, comprising:
a server computer system receiving, from a user computer system, a first request for content of a first web page;
in response to the first request:
the server computer system sending the requested content of the first web page and first unrequested content; and
the server computer system instructing the user computer system to store a cookie including a first time value identifying when the first unrequested content was sent;
the server computer system receiving, from the user computer system, a second request for content of a second web page;
the server computer system comparing the first time value with a second time value corresponding to when the second request is received; and
based on the comparing, the server computer system determining whether to provide second unrequested content in a response to the second request.

9. The method of claim 8, further comprising:
in response to determining that a difference between the first and second time values satisfies a time interval, the server computer system providing the requested content of the second web page and the second unrequested content.

10. The method of claim 8, further comprising:
in response to determining that a difference between the first and second time values does not satisfy a time interval, the server computer system providing the requested content of the second web page without providing the second unrequested content.

11. The method of claim 8, further comprising:
the server computer system selecting the second unrequested content based on demographic information of a user of the user computer system.

12. The method of claim 8, further comprising:
the server computer system causing an application of the user computer system to display a content window behind a primary window being viewed by a user, wherein the server computer system provides the second unrequested content to the content window while the content window is behind the primary window.

13. A non-transitory, computer-readable medium having program instructions stored thereon that are capable of causing a computer system to perform operations comprising:
providing content of a first web page, first unrequested content, and a cookie to a user computer system, wherein the cookie specifies a time value identifying when the first unrequested content is provided;
receiving, from the user computer system, the cookie and a request for content of a second web page;
determining whether a difference between the time value and a current time value satisfies a threshold; and
in response to determining that the difference satisfies the threshold, providing, to the computer system, the content of the second web page, second unrequested content, and another cookie specifying another time value identifying when the second unrequested content is provided.

14. The computer-readable medium of claim 13, wherein the operations further comprise:
receiving, from the user computer system, another request for content of another web page; and
in response to determining that a difference between the other time value and a current time value does not satisfy the threshold, providing a response that includes content of the other web page and does not include a third unrequested content.

15. The computer-readable medium of claim 13, wherein the operations further comprise:
instructing a web browser executing on the user computer system to present the second unrequested content in a content window separate from a primary window displaying content of the second web page.

16. The computer-readable medium of claim 15, wherein the operations further comprise:

instructing the web browser to present the content window in front of the primary window such that the content window occludes at least a portion of the primary window.

17. The computer-readable medium of claim 15, wherein the operations further comprise:
    instructing the web browser to present the content window behind the primary window such that the primary window occludes at least a portion of the content window.

\* \* \* \* \*